INVENTOR.
KARL KOLB

United States Patent Office 3,543,406
Patented Dec. 1, 1970

3,543,406
ATTACHMENT FOR DRAWING COMPASSES
Karl Kolb, Nuremberg, Germany, assignor to J. S. Staedtler, Nuremberg, Germany, a firm
Filed Dec. 5, 1968, Ser. No. 781,414
Claims priority, application Germany, Dec. 7, 1968, St 22,013
Int. Cl. B431 9/02
U.S. Cl. 33—27     4 Claims

ABSTRACT OF THE DISCLOSURE

An attachment for attaching a drawing implement to one leg of compasses in such a manner that the point of the drawing implement can be moved into close proximity with the point on the other leg of the compasses. The attachment comprises a peg detachably secured to said one leg of the compasses, a holder carrying the drawing implement, and a ball-and-socket joint between the peg and the holder to allow the holder to be tilted and swivelled relative to the peg. The holder has a waisted portion to allow the implement to lie close to said other leg of the compasses.

BACKGROUND OF THE INVENTION

This invention relates to an attachment for attaching drawing implements to drawing compasses, comprising an adapter peg attachable to one leg of the compasses and to a holder for the implement.

In one proposed form of such an attachment, the peg and the holder are rididly connected together. Consequently, the position of the drawing implement in relation to the carrying leg of the compasses cannot be changed. In order to permit such an attachment to be used for spring-bow compasses equipped with a centre spindle, in such a way that the spindle does not interfere with the drawing implement, it has been proposed to cut the slot in the peg obliquely in relation to the holder attached to the peg. In another proposed arrangement a hinge-like joint is interposed between the peg and the holder to permit the point of the drawing implement to be moved closer to the point of the compasses. However, all these forms of construction have the drawback that when the tracing implement is placed at a considerable angle the flow of the ink from the implement may be impaired and satisfactory lines cannot be traced. For this reason, and in view of the obstructing presence of the centre spindle of spring-bow compasses, small circles cannot be traced. This considerably reduces the utility of compasses to which tracing or drawing implements are to be attached.

It is an object of the present invention to overcome this drawback and to provide an attachment which permits the point of the drawing or tracing implement to be moved into close proximity with the point of the compasses.

SUMMARY OF THE INVENTION

According to the present invention there is provided an attachment for attaching a drawing implement to compasses, comprising a peg to be attached to one leg of the compasses, a holder for said implement, and a ball-and-socket joint interposed between said peg and said holder to permit universal relative movement between said holder and said peg.

The arrangement according to the invention provides the holder and the drawing implement with universal deflectability in relation to the peg and, hence also, in relation to the leg of the compasses. The holder can be inclined at any suitable angle, not only with respect to the peg but it can also be swivelled round the peg. No difficulties should then arise when extremely small circles are to be drawn. Provided the peg is of appropriate size, such an attachment can then be used for virtually any kind of compasses.

Suitably, one end of the peg is formed with a ball which is received and held with an adjustable amount of friction in a socket of the holder. This friction may require adjustment after prolonged use and it may also depend upon the materials that are used.

In the further development of the invention, the socket is closed by a bearing member which can be adjustably pressed into contact with the ball. The ball is thus positioned between the base of the socket in the holder and the bearing member, and by suitably shaping these parts a satisfactory degree of friction between the ball and its socket can be produced.

Preferably, the bearing member is of a material which has a high coefficient of friction. For instance, the bearing member may be made of a synthetic plastics material. Another feature of the invention resides in urging the bearing member which closes the socket into contact with the ball by the adjustable thrust of a spring. For adjusting the friction in the bearing, a screw plug which closes the socket in the holder may be used.

Other features, details and advantages of the invention will be understood from the following description of a preferred embodiment of the invention.

DESCRIPTION OF THE PREFERRED EMBODIMENT

Figure 1:
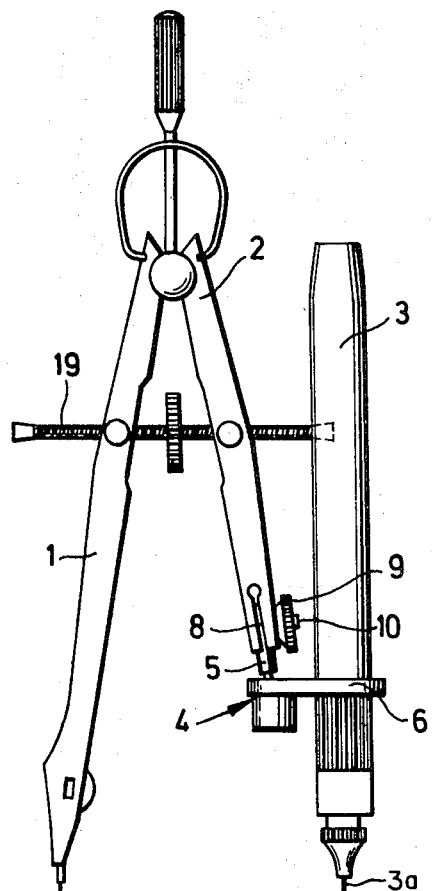
FIG. 1 is an elevation showing a spring-bow compass to which a drawing implement is attached.
Figure 2:
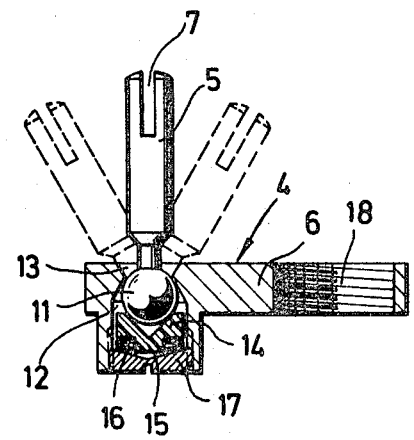
FIG. 2 is a partly sectional detail view on a larger scale, showing the attachment.
Figure 3:
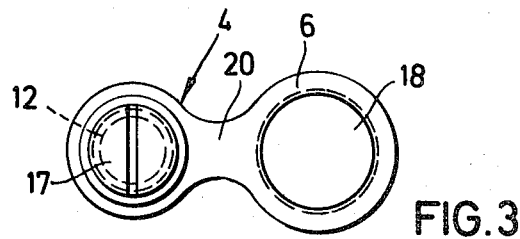
FIG. 3 is a view from beneath corresponding to FIG. 2.

Referring to the drawings the spring-bow compass has a center spindle 19 for adjusting the angle defined by the two compass legs 1 and 2. However, the invention is also applicable to compasses of any other form of construction. Attached to the compass is a marking implement 3 for use with Indian ink, but this implement could be replaced by a drawing or tracing implement of an alternative kind.

Attachment 4 comprises an adapter peg 5 and a holder 6 for the implement 3. The peg 5 is axially slotted at 7 and fits into a divided receiving bore 8 in the free end of one leg 2 of the compass. A transverse screw 10 in the leg 2 carries a milled clamping nut 9 and passes through the slot 7 in the peg 5.

The end of the peg 5 remote from slot 7 carries a ball 11 which, during assembly, is inserted into a socket 12 in the holder 4 from the underside of the holder in such a way that the ball bears against the top of the socket and the peg 5 passes through a bore 13. The socket 12 is closed by a bearing member 14 which likewise serves for positioning the ball 11, and which may consist of a synthetic plastics or other suitable friction-generating material. The bearing member 14 has a boss 15 surrounded by a compression spring 16, such as a coil spring or a dished spring, which presses against the bearing member 14 and which is supported by a screw plug 17 in the open end of the socket 12.

The holder 6 of the attachment 4 is provided with a bore 18, which may be threaded, for the reception therein of the implement 3.

On each side of its axis of symmetry, the holder 6 is waisted in such a way that a narrow neck 20 remains between the socket 12 and the bore 18. This neck permits the attachment 4 carrying the drawing implement 3 to be moved into close proximity with the point 1 of the compass. In some compasses which are intended for tracing very small circles, this feature is a virtual necessity.

In the same form in which it is used on compasses, the attachment according to the present invention may also be used for stencil tracing tools or like writing utensils, a facility which has the advantage that only one attachment is needed for both purposes.

Modifications to the above description may be made without departing from the scope of the following claims.

What is claimed is:

1. A device for releasably attaching a drawing implement to a compass, said device comprising in combination:

an elongate holder having on one end portion a receiver for a drawing implement;

a fastener releasably attachable to one leg of the compass; and a ball-and-socket joint joining the other end portion of the holder to the fastener, said joint permitting universal swiveling of the holder relative to the fastener, said fastener including a peg attachable on one end to said one leg of the compass and terminating in the ball of said joint and said holder having a portion defining the socket of the joint, said socket including adjustable pressure means for varying the pressure of the frictional engagement between the ball and the socket.

2. The device according to claim 1 wherein said socket is open at both ends, one end being constricted for retaining the ball in the socket, and wherein said variable pressure means comprise a bearing member slidable in the socket into engagement with the ball therein and a setting member adjustably fitted in the other end of the socket for varying the position of said bearing member by varying the position of the setting member thereby correspondingly changing the frictional pressure with which the ball engages the constricted socket end.

3. The device according to claim 2 wherein the surface of said bearing member has a high co-efficient of friction.

4. The device according to claim 2 wherein a compression spring is interposed between said bearing member and said setting member to bias the bearing member toward the ball.

References Cited

UNITED STATES PATENTS

| | | | |
|---|---|---|---|
| 682,539 | 9/1901 | Freuler | 33—149 |
| 1,061,846 | 5/1913 | Iacovino | 33—27 |
| 2,367,584 | 1/1945 | Hunt | 33—27 |

FOREIGN PATENTS

| | | |
|---|---|---|
| 1,099,578 | 3/1955 | France. |
| 159,522 | 1909 | Great Britain. |
| 47,965 | 7/1909 | Switzerland. |
| 360,507 | 4/1962 | Switzerland. |
| 755,801 | 4/1967 | Canada. |

HARRY N. HAROIAN, Primary Examiner